June 28, 1966   W. F. JUPTNER ETAL   3,258,556
ELECTROMAGNETIC ACTUATOR AND RELAY COMPRISING SAME
Filed May 13, 1963   2 Sheets-Sheet 1
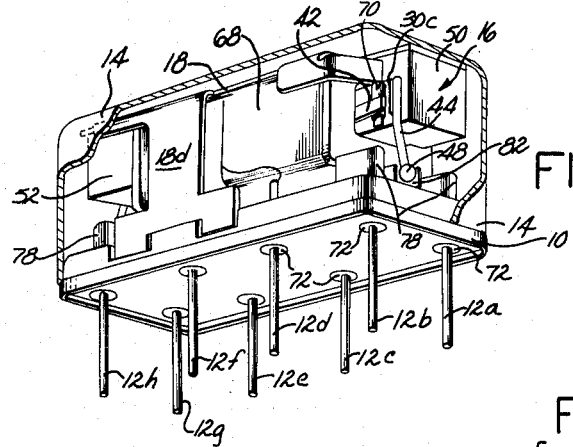
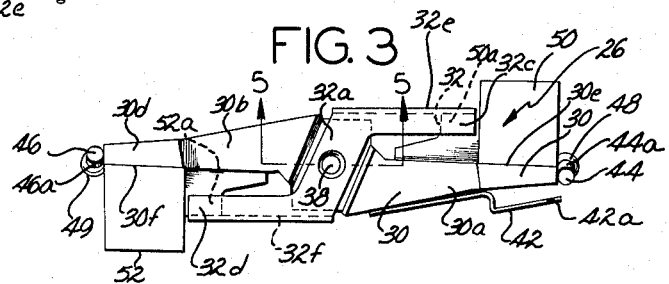
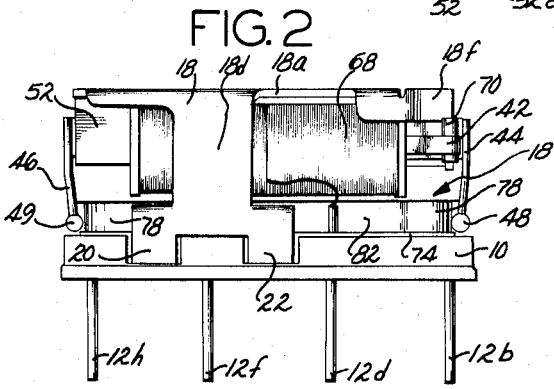
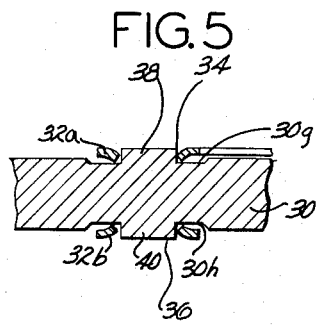
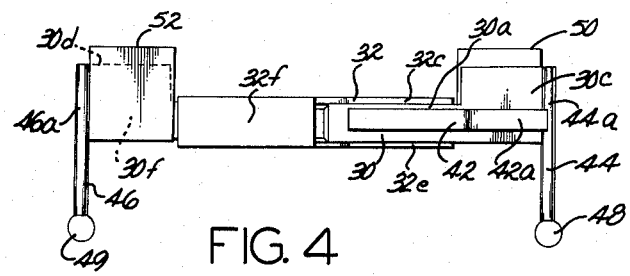
INVENTORS
WILLIAM F. JUPTNER
FRANK L. KAGELE
BY
ATTORNEY June 28, 1966     W. F. JUPTNER ET AL     3,258,556
ELECTROMAGNETIC ACTUATOR AND RELAY COMPRISING SAME
Filed May 13, 1963     2 Sheets-Sheet 2

INVENTORS
WILLIAM F. JUPTNER
FRANK L. KAGELE
BY
ATTORNEY

United States Patent Office 3,258,556
Patented June 28, 1966

---

3,258,556
ELECTROMAGNETIC ACTUATOR AND RELAY COMPRISING SAME
William F. Juptner, Laguna Beach, and Frank L. Kagele, Costa Mesa, Calif., assignors to Babcock Electronics Corporation, Costa Mesa, Calif., a corporation of California
Filed May 13, 1963, Ser. No. 280,012
7 Claims. (Cl. 200—87)

The present invention relates generally to electromagnetic actuators and methods for making same, and more particularly to electromagnetic circuit controlling devices such as relays.

Heretofore, electromagnetic devices have been so constructed that they have required considerable installation and operating room. Generally, such prior devices have comprised a magnetic core or frame having an electromagnetic coil which is energizable to create magnetic flux flow in the core. Such devices have also included an armature for movement with respect to the core in response to magnetic flux flow through the latter, such armature being employed as an actuating member to operate a pair of electrical contacts or other actuatable means.

As will hereinafter become more apparent, such prior structures have necessarily resulted in a relatively large and cumbersome end product, not only because of the physical arrangement of parts and components, but also because the structure has been considerably less efficient than desired. Such lack of maximum efficiency has required the various components to be made larger than actually necessary.

Within the past one or more decades, some of the most significant and important scientific advancements have been made with respect to the size of the end product. That is, as a result of extensive missile and other outer space activities during this time, a serious need has developed for electrical and electronic components which are of minimum size and weight. The aforementioned prior construction of electromagnetic actuators prevented any further minimization of the size and weight of relays and other electroresponsive devices using such actuators.

It is an object of the present invention to provide an electromagnetic actuator which can perform as much work as heretofore performed by considerably larger actuators.

Another object of the present invention is to provide an electromagnetic actuator as characterized above which is more efficient than prior actuators.

Another object of this invention is to provide an electromagnetic actuator which, because of its unique construction, can be enclosed within an extremely small enclosure.

A further object of the present invention is to teach a method of making an electromagnetic actuator which is extremely small and compact but which is operable to perform a considerable amount of work.

Another object of the present invention is to teach a unique method for making an armature assembly for use in an electromagnetic actuator.

A still further object of the present invention is to teach a unique method of making an armature-coil assembly which is extremely small and compact, and which is capable of performing a considerable amount of work.

A further object of the present invention is to provide an electromagnetic actuator as characterized above which is so constructed that the electrical energy applied to an electromagnetic winding thereof is used more efficiently in generating usable magnetic force.

An even further object of the present invention is to provide an electromagnetic relay which utilizes an electromagnetic actuator as characterized above, and which therefore has the same attributes with respect to size and efficiency of operation.

A further object of the present invention is to provide electromagnetic actuators and relays which are simple and inexpensive to manufacture, and which are rugged and dependable in operation.

The novel features which we consider characteristic of our invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 1 is a fragmentary perspective view of an electromagnetic relay according to the present invention;

FIGURE 2 is a side elevational view of the relay of FIGURE 1, the enclosure cover having been removed;

FIGURE 3 is a top plan view of the armature assembly of the relay;

FIGURE 4 is a side elevational view of the armature assembly of FIGURE 3;

FIGURE 5 is a fragmentary sectional view taken substantially along line 5—5 of FIGURE 3;

Like reference characters indicate corresponding parts throughout the several views of the drawings.

Figure 6:
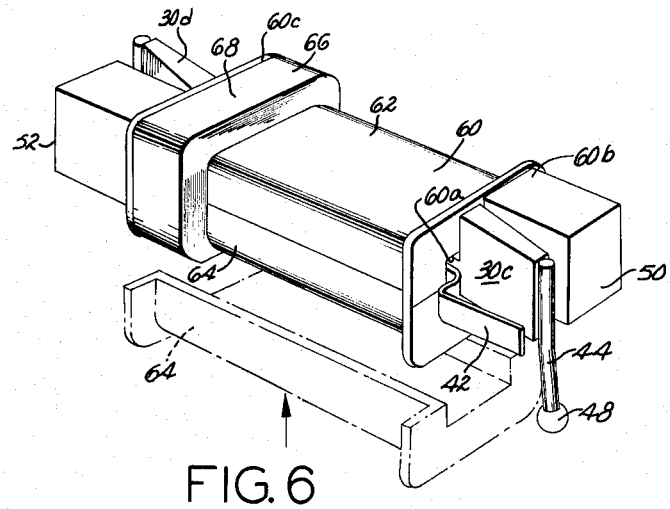
FIGURE 6 is a perspective view of the armature assembly with portions of the coil assembly thereon.

Referring to FIGURE 1 of the drawings, the embodiment chosen for illustration of the present invention comprises, in its completed form, a base 10 which carries a plurality of electrical terminals 12a, 12b, 12c, 12d, 12e, 12f, 12g and 12h, and a cup shaped cover 14.

Within the enclosure provided by cover 14 is an electromagnetic actuator 16 and a contact assembly 18, the latter of which is positioned on base 10 as will hereinafter be explained.

The electromagnetic actuator 16 comprises a frame 18 formed of magnetically permeable material. As shown most clearly in FIGURE 7, the frame 18 has an intermediate portion 18a which is formed integrally with oppositely disposed end portions 18b and 18c. Also formed in frame 18 are a pair of oppositely disposed support members 18d and 18e, the lower end portions of which are bifurcated to provide mounting tangs 20 and 22. Frame 18 is provided at one end with a tab or extension 18f having a depending end portion as shown at 18g in FIGURE 7.

Frame 18 may be made in any desired manner of relatively thin material having the proper magnetic qualities. In this regard, it should be noted that each of the opposite end portions 18b and 18c is provided with a relatively large flat under-surface for receiving a stationary magnetic pole piece as will hereinafter be explained. Such large under-surfaces correspond to the relatively thin but wide intermediate portion 18a with regard to magnetic properties.

Positioned within the frame 18 and attached thereto is an armature-coil assembly 24. The armature-coil assembly 24 comprises an armature assembly 26 as shown in FIGURES 3, 4 and 5 to which is added an electromagnetic winding or coil assembly 28.

Armature assembly 26 comprises a generally Z-shaped armature member 30 which is pivotally mounted on a reversely formed Z-shaped support member 32. Armature member 30 is formed with a pair of oppositely disposed arms 30a and 30b which are substantially identical in shape and taper down to a pair of armature pole pieces 30c and 30d respectively. However, such armature pole pieces 30c and 30d are relatively large as compared to the arms 30a and 30b of the armature 30. Each armature pole piece is formed with a smooth flat surface, as shown at 30e and 30f, to afford pole faces for cooperation with stationary magnetic pole pieces to be hereinafter described.

As shown most clearly at 30g and 30h, the opposite sides of the central portion of the armature 30 are recessed to receive intermediate portions 32a and 32b of the armature support member 32. Such intermediate portions are thereby caused to be at least partially recessed within the armature 30 to provide a more compact assembly as will hereinafter become more apparent.

The upper intermediate portion 32a of support member 32 is provided with oppositely disposed extensions 32c and 32d. Depending from each of such extensions along the opposite sides thereof are flange members 32e and 32f respectively.

The intermediate portions 32a and 32b are formed with aligned openings at at 34 and 36 respectively, the material about such openings being bent inwardly to provide annular bearing surfaces for opposite sides of the armature 30. The armature 30 is formed with a pair of oppositely disposed cylindrical extensions 38 and 40 which are positioned firmly within the aligned openings 34 and 36 as shown most clearly in FIGURE 5 of the drawings. Such extensions are coined during the forming of armature 30. This arrangement maintains the good magnetic properties of the armature which would not be so if a pivot pin were to be used in an opening formed in armature 30.

The lower intermediate portion 32b of support member 32 is formed separate and apart from the remaining portions of such support member. As such, the armature, during assembly, is positioned against the intermediate portion 32a and thereafter the member 32b is positioned across the armature 30 so as to interconnect the depending flange portions 32e and 32f of the support member 32. The extensions 38 and 40 are fitted into the aligned openings 34 and 36 as above explained.

A leaf spring 42 having a generally V-shape is attached to the side of arm 30a of armature 30 as by welding, soldering or the like. The end portion 42a of leaf spring 42 is positioned in spaced relation to armature pole piece 30c for reasons which will hereinafter be explained in detail.

Attached to opposite ends of armature 30 are actuators 44 and 46. Each such actuator comprises a rod as shown at 44a and 46a respectively the upper end portions of which are welded to the end portions of the respective armature pole pieces 30c and 30d. The lower extremity of each rod is formed as a sphere as at 48 and 49. These spheres may be formed of glass or any other electrical insulating material for actuation of certain electrical contacts as will hereinafter appear.

A generally cubical stationary pole piece, as shown at 50 and 52, is attached to the under-surface of each of the opposite end portions 18c and 18d of frame 18. However, such pole pieces also serve to mount the support member 32 in a stationary position with respect to frame 18. For this purpose each such pole piece is provided with mounting extension as shown at 50a and 52a. The extension 50a of pole piece 50 is inserted within the right angle formed by extension 32c and flange portion 32e of support member 32. In like fashion, the extension 52a of pole piece 52 is positioned within the angle between extension 32d and flange portion 32f.

In making the subassembly comprising the armature 30, support member 32 therefore, and the stationary pole pieces 50 and 52, the said pole pieces are firmly clamped against the respective armature pole pieces 30 and 32 while the mounting extensions 50a and 52a are welded to the support member 32.

The next step in making an electromagnetic actuator according to the present invention is illustrated in FIGURE 6 of the drawings.

A tubular bobbin 60 having a generally rectangular cross section is positioned on the armature assembly. However, in order to obtain maximum efficiency in generating magnetic flux within the armature, the opening 60a within the bobbin 60 must closely approximate the limits of movement of the armature 30. As such, the armature assembly as above described cannot be inserted within the opening 60a of bobbin 60 since the armature and stationary pole pieces are much too large. As such, the bobbin 60 is provided with a longitudinal slot, opening or separation to provide two mating bobbin sections 62 and 64. As shown in broken lines in FIGURE 6, the bobbin sections 62 and 64 are positioned around opposite sides of the small central portion of the armature assembly to provide a bobbin 60 which encircles such assembly. Each bobbin section is formed with suitable flanges whereby the resulting bobbin 60 has end flanges 60b and 60c. Suitable interlocking means may be provided to insure alignment of the bobbin sections in the proper relative positions.

After the bobbin sections have been assembled to provide the bobbin 60, suitable turns of magnetic wire 66 are provided thereon. Such turns provide a winding which fills the entire space between the bobbin flanges 60b and 60c. In this manner, there is provided on the armature 30 is free to pivot thereon with respect to ing or coil 68 which closely encircles the armature 30.

After the armature-coil assembly has been made, the stationary pole pieces 50 and 52 are welded to the under-surfaces of the end portions 18b and 18c of frame 18. In addition to completing the magnetic circuit between armature 30 and frame 18, this operation firmly anchors the support member 32 with respect to frame 18 so that the armature 30 is free to pivot thereon with respect to the stationary pole pieces.

The coil or winding 68 is firmly held between the support members 18d and 18e of frame 18 so that armature 30 is free to pivot within the opening 60a of bobbin 60 without interference of any kind.

When the armature-coil assembly is inserted upwardly between the support members 18d and 18e of frame 18, the extended portion 42a of leaf spring 42 is positioned on the outside of the depending extension 18g of frame 18. Spring 42 is then operable to bias the armature 30 to its retracted position as will hereinafter appear.

A plastic sleeve 70 may be positioned over the depending extension 18g to limit the return travel of armature 30 to its retracted position.

As above explained, the base 10 is provided with an appropriate number of electrical terminals. As shown in FIGURE 1, each such terminal extends through the base 10 and in insulatedly secured thereto by insulation means as shown at 72. Thus each of the terminals 12a, 12b, 12c, 12d, 12e, 12f, 12g and 12h is electrically separate and independent.

Positioned on top of base 10 is a sheet 74 of insulating material formed with appropriate through openings for accommodating the upper end portions of the various electrical terminals. A contact assembly 76 is positioned on the insulating sheet.

Attached to the upper end portion of each of the four corner terminals 12a, 12b, 12g and 12h, is a generally U-shaped stationary contact 78. Each stationary contact 78 is formed with a reversely bent mounting portion 78a about the respective terminal. Such mounting portions provide firm mechanical connection between the contact and the terminal post. To provide good electrical connection therebetween, a bead of solder, as shown at 80, is provided within the reversely bent portion 78a.

Positioned on insulating sheet 74 so as to individually extend between a pair of contacts 78 is a pair of contactors 82. Each contactor is provided with an L-shaped mounting bracket 84 which partially encircles the particular terminal post 12c and 12f and is attached thereto as by welding, soldering or the like.

The contactors 82 and contacts 78 are formed of resilient material of good electrical conductivity.

Figure 7:
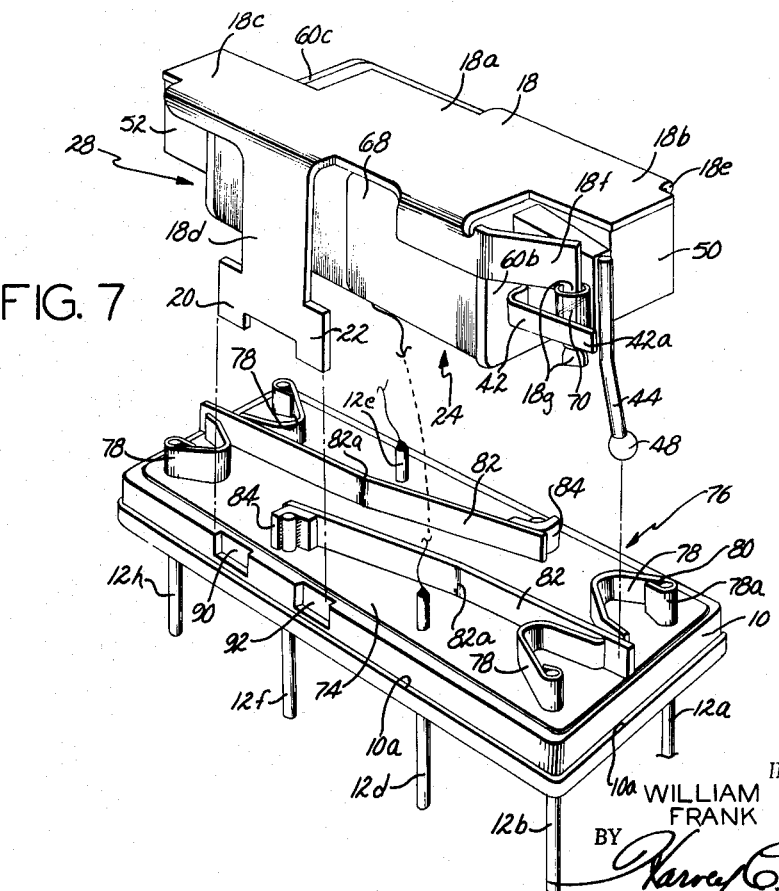
FIGURE 7 is an exploded perspective view of the electromagnetic actuator and contact assembly for the relay of FIGURE 1.

The opposite ends of the winding 68 are attached to terminal posts 12d and 12e as shown in FIGURE 7 of the drawings. Thereafter, the armature-coil assembly which constitutes an electromagnetic actuator is positioned over the electrical contact assembly 76, the mounting tabs 20 and 22 of support members 18d and 18e being positioned within appropriate slots 90 and 92 on opposite sides of base 10. Such mounting tabs may be welded to base 10 to firmly position the electromagnetic actuator over the contact assembly 76.

The cover 14 is then positioned over the actuator and contact assembly in firm engagement with base 10. To accommodate cover 14, base 10 may be provided with a flange 10a against which the bottom of cover 14 may rest. If desired, the cover 14 may be secured to base 10 as by soldering, welding or the like to hermetically seal the electromagnetic actuator and contact assembly therewithin.

The electromagnetic relay of this invention may be mounted in a given electronic apparatus merely by insertion of the terminals in an appropriately formed socket (not shown). The terminals 12d and 12e are thereby connected to a suitable source of electrical power for energization of winding 68.

The contact assembly 76 shown in FIGURE 7, provides a double pole, double throw relay. The common terminals, of course, are terminals 12c and 12f which carry the contactors 82. Each contactor is initially biased into engagement with one of its stationary contacts 78, such contacts thereby being the normally closed contacts. The other contacts 78, of course, are the normally open contacts as will hereinafter appear in greater detail.

The leaf spring 42 biases armature member 30 to its retracted position. Referring to FIGURE 3 of the drawings, the leaf spring 42 urges the armature 30 in a clockwise direction about pivot pin 40. As a result, an air gap is provided between each of the armature pole pieces 30 and 32 and their respective stationary pole pieces 50 and 52. Spring 42 urges pole piece 30c into engagement with the plastic sleeve 70 on travel limiting means 18g of frame 18. This, of course, determines the size of the several air gaps.

With armature 30 in its retracted position, the contactors 82 are in engagement with the stationary contacts mounted on terminals 12b and 12g. That is, each contactor 82 is attached to its respective terminal post such as to be biased into engagement with its normally closed stationary contact 78. As a result, as long as winding 68 is de-energized the electrical circuits between terminals 12b and 12f, and between terminals 12c and 12g are completed.

Upon energization of winding 68 through terminals 12d and 12e, magnetic flux is generated in armature 30. Such flux traverses the aforementioned air gaps between the armature pole pieces and the stationary pole pieces and also flows through frame 18. The flow of magnetic flux across the air gaps causes the armature to be pivoted so as to effect engagement of the armature pole pieces with the respective stationary pole pieces. Such movement, of course, is against the biasing force of leaf spring 42 and causes the spherical lower end portions 48 and 50 of the actuators 44 and 46 to move the respective contactors 82. That is, as shown in FIGURE 3 of the drawings, energization of winding 68 causes armature 30 to be pivoted on pins 38 and 40 in a counterclockwise direction. This causes the sphere 48 of actuator 44 to move contactor 82 out of engagement with the contact 78 on terminal 12b and into engagement with the contact mounted on terminal 12a. At the same time, the sphere 49 at the lower end of actuator 46 moves its contactor 82 out of engagement with the contact on terminal 12g and into engagement with the contact on terminal post 12h. As a result, the previously made circuits through terminals 12b and 12g are interrupted and the circuits between terminals 12f and 12a and between terminals 12c and 12h are completed.

Upon the de-energization of winding 68, of course, the leaf spring 42 returns the armature 30 to its retracted position and the contactors 82 are returned by their inherent bias into engagement with the aforementioned stationary contacts at terminals 12b and 12g.

The position of electromagnetic winding 68 on armature 30 causes the electrical energy in such winding to be used efficiently. That is, due to the aforedescribed physical arrangement, a greater portion of the flux generated in the magnetic circuit is utilized to urge the armature pole pieces toward the stationary pole pieces. This is a result of the fact that the winding 68 is positioned very close to the air gaps between the pole pieces so that a minimum amount of fringe flux is permitted to exist at the air gaps. Fringe flux is that flux which does not flow in a straight line between the pole faces, but rather follows an arcuate path. Such flux is most prevalent at the outer edges of the pole faces and is of substantially no value in generating an attractive force between the pole faces.

Placement of the armature within the coil also contributes to more efficient use of the electrical energy, due to the fact that a greater concentration of magnetic flux is thereby provided within the armature. This results from the fact that virtually the enire lengh of the armature is immersed in the magnetic field of the winding. Since the air gaps must necessarily be close to the armature, such high concentration of magnetic flux is immediately available for creating the force which attracts the armature to the stationary poles.

Due to such increased efficiency in using the electrical energy, the winding 68 may be smaller and of less weight than prior electromagnetic windings.

As above explained, the use of a bobbin having separate bobbin sections enables a relatively small compact winding to be positioned about an armature having relatively large pole pieces at its opposite ends. This arrangement, of course, contributes to the making of an extremely compact electromagnetic actuator and relay assembly.

As will be readily understood by those persons skilled in the art, the actuator and relay configuration shown in the drawings and hereinabove described is merely for purposes of illustration. It is contemplated within the scope of this invention that such an electromagnetic actuator may be employed for operating substantially any appropriate device or devices. That is, the actuator need not be employed to operate electrical contacts of this or other appropriate design, but rather may be employed to effect movement of other instrumentalities if desired.

Also, it is contemplated that electrical relays of substantially any design may be employed using the subject invention. Such relays need not be of the double pole double throw variety as shown and described herein, but rather may be of any preferred design configuration.

Although we have shown and described certain specific embodiments of our invention, we are fully aware that many modifications thereof are possible. Our invention, therefore, is not to be restricted except insofar as is necessitated by the prior art and by the spirit of the appended claims.

We claim:

1. An electromagnetic actuator comprising in combination, a generally U-shaped magnetic frame having a thin intermediate portion and relatively large magnetic pole pieces, an armature having a reduced central portion and relatively large opposite end portions affording armature pole pieces for cooperation with said frame pole pieces, an elongated support member fixed relative to said frame and pivotally carrying said armature, and a tubular winding on the central portion of said armature having a through opening incapable of passing said armature pole pieces, said winding being positioned adjacent the thin intermediate portion of said frame within the U-shaped configuration thereof, whereby energization of said winding causes movement of said armature relative to said frame.

2. An electromagnetic relay comprising in combination, a generally U-shaped magnetic frame having a relatively thin intermediate portion and relatively large magnetic pole pieces, an armature having a reduced central portion and relatively large opposite end portions affording armature pole pieces for engagement with said frame pole pieces, an elongated support member fixed relative to said frame and pivotally carrying said armature, a tubular winding on the central portion of said armature having a through opening incapable of passing said armature pole pieces, said winding being positioned adjacent the thin intermediate portion of said frame within the U-shaped configuration thereof, and circuit controlling means comprising a contact fixed relative to said frame and a contactor movable by said armature into and out of engagement with said stationary contact in response to energization and de-energization of said winding.

3. An electromagnetic actuator comprising in combination, a frame having a pair of relatively fixed pole pieces, an electromagnetic winding adjacent said frame between said pole pieces and having a through opening, an armature within said opening of said winding for movement into and out of engagement with said pole pieces in accordance with energization of said winding, and support means for said armature also positioned within said opening in said winding and anchored to said fixed pole pieces, said armature and support means therefor being elongated in the direction of the axis of said opening and being relatively narrow in directions normal thereto to provide a small compact actuator.

4. An electromagnetic actuator according to claim 3 wherein said pole pieces are offset from said frame to be individually disposed at the opposite open ends of said through opening in said winding, whereby substantially all of said armature is within the opening of said winding for maximum magnetic effect thereon.

5. An electromagnetic actuator according to claim 3 wherein said armature is formed with relatively large oppositely disposed armature pole pieces incapable of passing through said opening in said winding to provide maximum efficiency for said compact actuator.

6. An electromagnetic actuator comprising in combination, a generally U-shaped magnetic mounting frame having a relatively thin intermediate portion and a pair of side portions for mounting said frame, said frame being formed with a pair of spaced relatively fixed pole pieces, an electromagnetic winding having a through opening and positioned within said U-shaped frame adjacent said intermediate and side portions, an armature within said opening of said winding for movement into and out of engagement with said pole pieces in accordance with energization of said winding, and support means for said armature also positioned within said opening in said winding and anchored to said fixed pole pieces to provide a small compact actuator.

7. An electromagnetic actuator according to claim 6 wherein said pole pieces of said frame are disposed at opposite ends of said intermediate portion and are offset therefrom to provide with said frame a location for said winding bounded by said intermediate and side portions of said frame and said pole pieces to provide a compact actuator.

References Cited by the Examiner

UNITED STATES PATENTS

| | | | |
|---|---|---|---|
| 2,624,031 | 12/1952 | Ballman | 200—87 |
| 2,677,875 | 5/1954 | White et al. | 29—155.58 |
| 2,767,279 | 10/1956 | Hall | 200—87 |
| 2,856,483 | 10/1958 | Farmer | 200—93.32 |
| 2,916,584 | 12/1959 | Molyneux | 200—87 |
| 2,933,660 | 4/1960 | Geese et al. | 317—165 |
| 2,946,876 | 7/1960 | Lockwood et al. | 200—104 |
| 2,951,134 | 8/1960 | Lazich | 200—87 |
| 2,965,954 | 12/1960 | Baker | 29—155.58 |
| 3,019,375 | 1/1962 | Geyer et al. | 336—208 |
| 3,047,691 | 7/1962 | Kohoutek et al. | 200—93 |
| 3,112,898 | 12/1963 | Stahl | 336—198 |
| 3,118,033 | 1/1964 | Somers et al. | 200—104 |
| 3,138,677 | 6/1964 | Adams | 200—87 |
| 3,147,349 | 9/1964 | Welch et al. | 200—87 |
| 3,154,653 | 10/1964 | Rowell | 200—87 |
| 3,172,975 | 3/1965 | Williams | 317—198 |
| 3,178,532 | 4/1965 | Smith | 200—87 |

BERNARD A. GILHEANY, *Primary Examiner.*

ROBERT K. SCHAEFER, *Examiner.*

B. DOBECK, *Assistant Examiner.*